(12) United States Patent
Toyota et al.

(10) Patent No.: US 11,453,273 B2
(45) Date of Patent: Sep. 27, 2022

(54) VEHICLE

(71) Applicant: TOYOTA JIDOSHA KABUSHIKI KAISHA, Toyota (JP)

(72) Inventors: Masaru Toyota, Toyota (JP); Sho Tsumita, Seto (JP); Yoshiyuki Ryuno, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/327,999

(22) Filed: May 24, 2021

(65) Prior Publication Data

US 2022/0024283 A1 Jan. 27, 2022

(30) Foreign Application Priority Data

Jul. 21, 2020 (JP) .............................. JP2020-124676

(51) Int. Cl.
*B60J 1/17* (2006.01)
*E05F 11/38* (2006.01)
*B60J 1/20* (2006.01)
*B60J 1/00* (2006.01)

(52) U.S. Cl.
CPC .............. *B60J 1/17* (2013.01); *B60J 1/2097* (2013.01); *E05F 11/382* (2013.01); *B60J 1/006* (2013.01)

(58) Field of Classification Search
CPC . B60J 5/0402; B60J 1/17; B60J 5/0419; B60J 1/2097; E05F 11/382
USPC ......................................... 296/146.2, 146.16
See application file for complete search history.

(56) References Cited

U.S. PATENT DOCUMENTS

| 1,684,636 | A | * | 9/1928 | Mendenhall | ........... | B60J 1/2097 |
| | | | | | | 292/DIG. 72 |
| 4,119,341 | A | * | 10/1978 | Cook | ..................... | B62D 33/06 |
| | | | | | | 296/146.16 |
| 5,096,757 | A | * | 3/1992 | Chen | ..................... | B60J 10/248 |
| | | | | | | 296/146.16 |
| 5,199,217 | A | * | 4/1993 | Roze | ..................... | E05F 11/385 |
| | | | | | | 49/375 |
| 5,907,927 | A | * | 6/1999 | Lieb | .......................... | B60J 1/17 |
| | | | | | | 49/375 |

(Continued)

FOREIGN PATENT DOCUMENTS

| JP | 2001-001755 A | 1/2001 |
| JP | 2015-085908 A | 5/2015 |

*Primary Examiner* — Jason S Morrow
(74) *Attorney, Agent, or Firm* — Finnegan, Henderson, Farabow, Garrett & Dunner, LLP (57) ABSTRACT

A vehicle may include a vehicle body, a door, a window frame, a window panel, a lower support and a stopper. The window panel may be provided in the window frame, configured to be manually raised and lowered, and supported to be movable between an upper limit position where the window panel closes an opening of the window frame and a lower limit position where the window panel opens the opening of the window frame. The lower support may include a groove. The groove may be configured to receive a lower edge of the window panel when the window panel is located at the lower limit position. The stopper may be disposed in the groove of the lower support and include an abutting surface configured to abut the lower edge of the window panel, wherein the abutting surface may be curved to protrude upward.

9 Claims, 5 Drawing Sheets

(56) References Cited

U.S. PATENT DOCUMENTS

| | | | |
|---|---|---|---|
| 6,330,764 B1 * | 12/2001 | Klosterman | E05F 11/385 |
| | | | 49/506 |
| 6,397,524 B1 | 6/2002 | Sakaguchi et al. | |
| 2013/0050797 A1 * | 2/2013 | Takahashi | B60J 1/17 |
| | | | 359/245 |

* cited by examiner

VEHICLE

CROSS-REFERENCE TO RELATED APPLICATION

This application claims priority to Japanese Patent Application No. 2020-124676, filed on Jul. 21, 2020, the entire contents of which are incorporated herein by reference.

TECHNICAL FIELD

The art disclosed herein relates to a vehicle.

BACKGROUND

Japanese Patent Application Publication No. 2015-85908 describes a window for a railroad vehicle. This window has an opening in a window panel set within a window frame, and a small window configured to be manually raised and lowered is provided in this opening.

SUMMARY

In a vehicle that travels on a road, typically a window panel provided in a door is opened and closed by an elevating device. The elevating device for the window panel is arranged inside the door and includes a mechanism configured to move the window panel in an up-down direction in accordance with an operation of a motor or manipulation by a user. Contrary to this, for example in a single-passenger compact vehicle, a window panel configured to be manually raised and lowered may be employed. A window panel configured to be manually raised and lowered refers to a window panel that is configured to be manipulated in the up-down direction directly by the user without intervention of an elevating device. For example, employing the window panel configured to be manually raised and lowered reduces the weight of the vehicle since the aforementioned elevating device is not necessary. The window panel configured to be manually raised and lowered is not limited to being employed in a window frame provided in a door, but it may be employed in a window frame provided in a vehicle body.

The window panel configured to be manually raised and lowered is movable between an upper limit position where the window panel closes an opening of the window frame and a lower limit position where the window panel opens the opening of the window frame. A stopper is provided at the lower limit position, and a lower edge of the window panel is supported by the stopper. In order to avoid damage to the window panel, the stopper is typically constituted of a flexible material. However, a hard foreign matter such as a small stone tends to fall on the stopper at the lower limit position due to its structural nature to receive the window panel from above. In this case, the foreign matter may be caught between the window panel and the stopper, and thereby the window panel may be damaged. To avoid this, consideration may be given to reducing the size of the stopper to make the foreign matter less likely to fall on the stopper. However, the stopper in reduced size may facilitate detachment of the lower edge of the window panel from the stopper when an impact or vibration is applied to the window panel, and another problem may arise therefrom.

In view of the above, the disclosure herein provides a novel structure related to a stopper provided at a lower limit position in a vehicle that employs a window panel configured to be manually raised and lowered.

A vehicle disclosed herein may comprise a vehicle body; a door provided on the vehicle body and configured to be opened and closed with respect to the vehicle body; a window frame provided in the vehicle body or the door; a window panel provided in the window frame, configured to be manually raised and lowered, and supported to be movable between an upper limit position where the window panel closes an opening of the window frame and a lower limit position where the window panel opens the opening of the window frame; a lower support comprising a groove, the groove being configured to receive a lower edge of the window panel when the window panel is located at the lower limit position; and a stopper disposed in the groove of the lower support and comprising an abutting surface configured to abut the lower edge of the window panel, wherein the abutting surface is curved to protrude upward.

In the vehicle described above, the window panel configured to be manually raised and lowered is employed in the opening of the window frame provided in the door or the vehicle body. This window panel is configured to be directly manipulated by a user in an up-down direction between the upper limit position where the window panel closes the opening of the window frame and the lower limit position where the window panel opens the opening of the window frame. When the window panel is at the lower limit position, the lower edge of the window panel is housed within the groove of the lower support and abuts the abutting surface of the stopper. The stopper being disposed within the groove of the lower support makes the lower edge of the window panel less likely to be detached from the stopper. On the other hand, the stopper being disposed within the groove of the lower support allows a foreign matter such as a small stone to fall on the abutting surface of the stopper. However, the abutting surface of the stopper is curved to protrude upward, and thus the foreign matter is less likely to remain thereon. Therefore, it is possible to avoid the foreign matter being caught between the window panel and the stopper.

DETAILED DESCRIPTION

In an embodiment of the disclosure herein, an abutting surface of a stopper may be curved at least in a front-rear direction. In such a configuration, the abutting surface of the stopper is inclined in the front-rear direction. This facilitates removal of a foreign matter from the abutting surface by inertia generated by acceleration or deceleration of the vehicle.

In the above embodiment, the stopper may further comprise a vertical abutting surface at least one end of the abutting surface in the front-rear direction, and the vertical abutting surface may be vertical to the front-rear direction. Such a configuration makes a foreign matter within the groove less likely to climb onto the abutting surface. Here, being vertical to the front-rear direction means that an angle formed with the front-rear direction is in a range of 90 degrees±15 degrees.

In an embodiment of the disclosure herein, a groove of a lower support may comprise a pair of side surfaces opposed each other with the stopper interposed therebetween. In this case, a gap may be provided between at least one of the pair of side surfaces and the stopper. According to such a configuration, deformation of the stopper is not excessively restricted by the lower support when the lower edge of the window panel abuts the stopper. It should be noted that, the deformed stopper may abut the pair of side surfaces of the groove. Intentionally bringing the deformed stopper to abut the side surfaces of the groove curtails excessive deformation of the stopper.

In an embodiment of the disclosure herein, at least a part of the stopper may be constituted of a material that is more flexible than the window panel. The stopper may be constituted of a material having higher rigidity (that is, having a larger elastic coefficient) than the window panel, may have, for example, a hollow shape or a plate spring shape, and may exhibit required flexibility by the shape.

In an embodiment of the disclosure herein, the at least a part of the stopper may be constituted of a rubber material. The rubber material is one of materials having suitable flexibility to absorb impact and vibration. The rubber material may be natural rubber or synthetic rubber. The rubber material herein includes those called elastomers.

In an embodiment of the disclosure herein, the window frame may be provided in the door. With such a configuration, when the door is opened or closed with the window panel positioned at the lower limit position, the window panel can stably be supported by the lower support and the stopper. However, the window frame is not limited to being provided in the door and may be provided in a vehicle body. In this case, the window frame is not limited to being provided in an outer surface of the vehicle body, but it may be provided inside the vehicle body, and the window panel may be a partition between two seats.

In an embodiment of the disclosure herein, a knob configured to be gripped by a user may be provided on the window panel. Such a configuration facilitates the user to manipulate the window panel using the knob. However, the knob is not mandatory. In another embodiment, a recess in which the user can insert a finger may be directly provided in the window panel.

In the above embodiment, the knob may be provided with a movable hook configured to be manipulated by the user. In this case, the window frame may be provided with a hook receiver configured to engage with the hook when the window panel is located at the upper limit position. This configuration may lock the window panel at the upper limit position such that the window panel does not drop.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A vehicle 10 according to an embedment will be described with reference to the drawings. The vehicle 10 according to the present embodiment is a so-called automobile and travels on a road. In the drawings, a direction FR indicates the front in a front-rear direction (longitudinal direction) of the vehicle 10 and a direction RR indicates the rear in the front-rear direction of the vehicle 10. Further, a direction LH indicates the left in a left-right direction (width direction) of the vehicle 10 and a direction RH indicates the right in the left-right direction of the vehicle 10. Further, a direction UP indicates up in an up-down direction (height direction) of the vehicle 10 and a direction DN indicates down in the up-down direction of the vehicle 10. In the disclosure herein, the front-rear direction, the left-right direction, and the up-down direction of the vehicle 10 may simply be termed the front-rear direction, the left-right direction, and the up-down direction, respectively.

Figure 1:
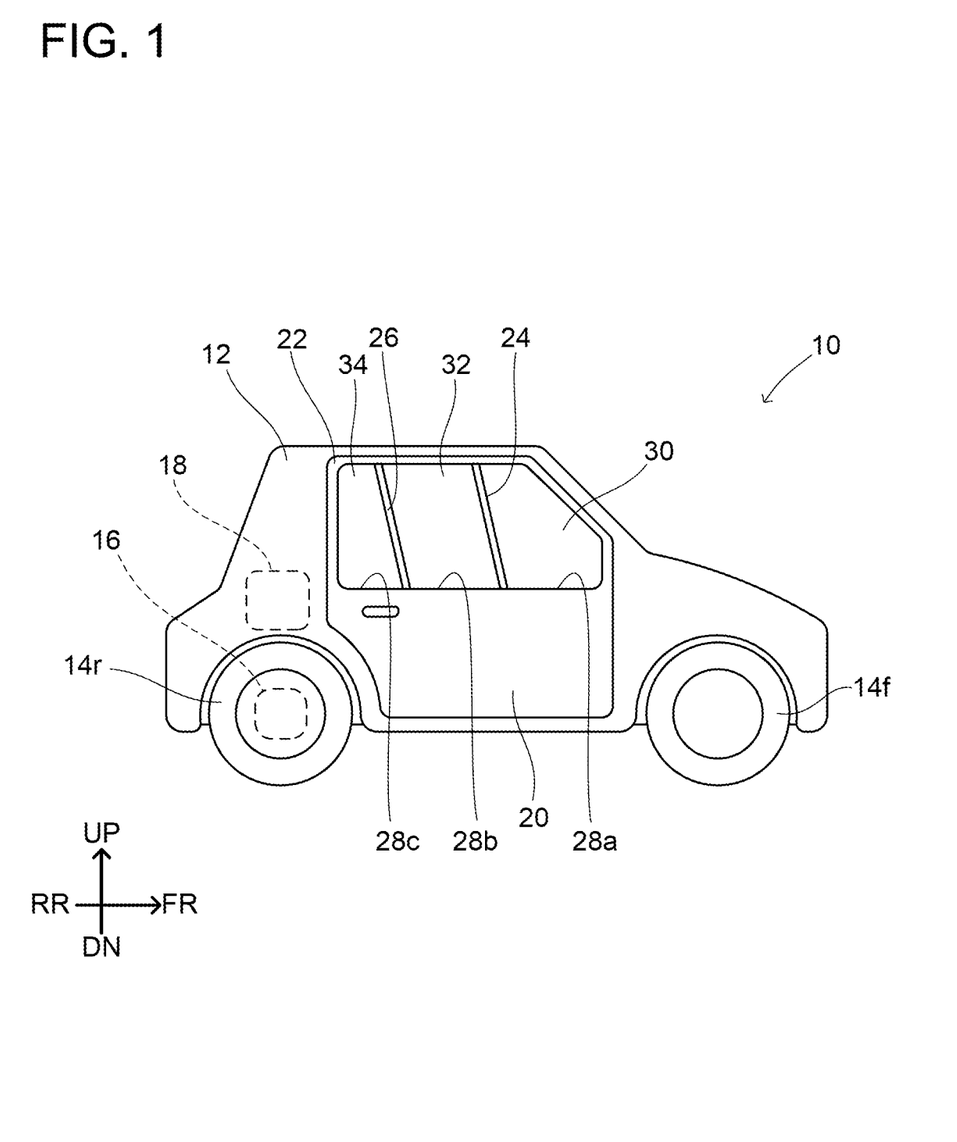
FIG. 1 is a schematic side view of an entirety of a vehicle 10 and primarily shows a right side surface of the vehicle 10.

As shown in FIG. 1, the vehicle 10 includes a vehicle body 12 and a plurality of wheels 14f, 14r. Although not particularly limited, the vehicle body 12 is constituted using a metal material and a resin material. The plurality of wheels 14f, 14r is attached rotatably with respect to the vehicle body 12. The plurality of wheels 14f, 14r includes a pair of front wheels 14f and a pair of rear wheels 14r. The number of the wheels 14f and 14r is not limited to four. The vehicle 10 according to the present embodiment has a compact size for a single passenger, however, no limitations are placed on the size of the vehicle 10 and the number of passengers the vehicle 10 accommodates.

The vehicle 10 further includes a traction motor 16 and a battery unit 18. The traction motor 16 is connected to the pair of rear wheels 14r and is configured to drive the pair of rear wheels 14r. The traction motor 16 is not limited to driving the pair of rear wheels 14r and may be configured to drive at least one of the plurality of wheels 14f, 14r. The battery unit 18 is connected to the traction motor 16 via a power supply circuit (not shown) and is configured to supply electric power to the traction motor 16. The battery unit 18 includes a plurality of secondary battery cells and is repeatedly rechargeable with external electric power. The vehicle 10 may include another power source such as a fuel cell unit or a solar power panel in addition to or as an alternative to the battery unit 18. Further, the vehicle 10 may include another prime mover such as an engine in addition to or as an alternative to the traction motor 16.

The vehicle 10 further includes a door 20. The door 20 is configured to be opened and closed with respect to the vehicle body 12. The door 20 is provided for a user to get into and get out of the vehicle 10. The door 20 is attached to the vehicle body 12 via a hinge (not shown) and is swingable in a horizontal direction. A window frame 22 is provided in the door 20. The window frame 22 is located in an upper portion of the door 20. Two bars 24 and 26 are provided within the window frame 22. The two bars 24 and 26 are parallel to each other and extend substantially in the up-down direction. The window frame 22 and the two bars 24 and 26 define three window openings 28a, 28b, and 28c.

The three window openings 28a, 28b, and 28c include a first window opening 28a, a second window opening 28b, and a third window opening 28c. The first window opening 28a is located forward of the second window opening 28b and the third window opening 28c and is surrounded by the window frame 22 and one bar 24. A first window panel 30 is provided in the first window opening 28a. The first window panel 30 cannot be opened nor closed and is fixed to the window frame 22 and the one bar 24. The second window opening 28b is located in the middle and is surrounded by the window frame 22 and the two bars 24, 26. A second window panel 32 is provided in the second window opening 28b. The second window panel 32 can be opened and closed and is attached such that it is movable in the up-down direction between the two bars 24 and 26. A third window panel 34 is provided in the third window opening 28c. The third window panel 34 cannot be opened nor closed and is fixed to the window frame 22 and the other bar 26.

The second window panel 32 is configured to be manually raised and lowered. A window panel configured to be manually raised and lowered refers to a window panel that is manipulated directly by a user in the up-down direction without intervention of a mechanism such as a conventional elevating device. Hereinbelow, the second window panel 32 and configurations related thereto will be described in detail with reference to FIGS. 2 to 5. In the following description, the second window opening 28b may simply be termed the window opening 28b and the second window panel 32 may simply be termed the window panel 32.

Figure 2:
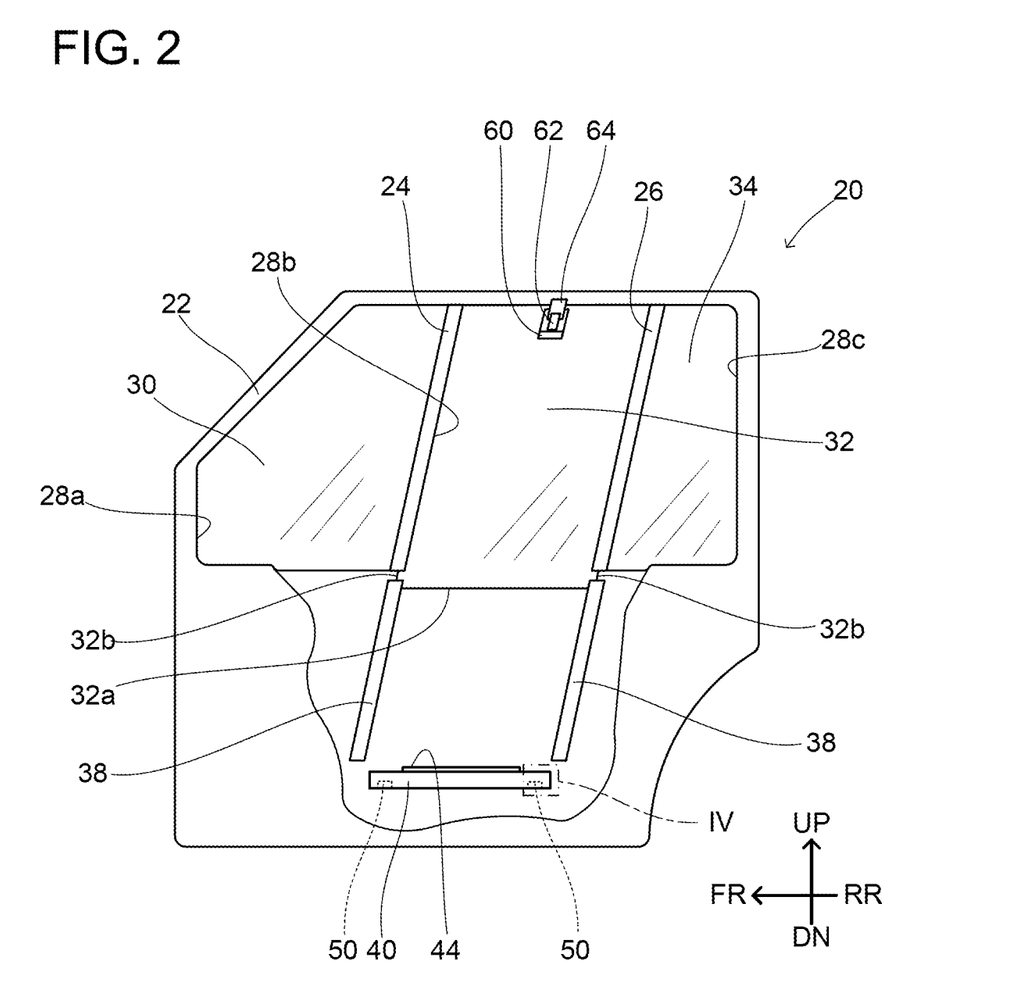
FIG. 2 shows a door 20 and its interior structure seen from within the vehicle 10 (that is, from within a cabin), where a window panel 32 is at an upper limit position.
Figure 3:
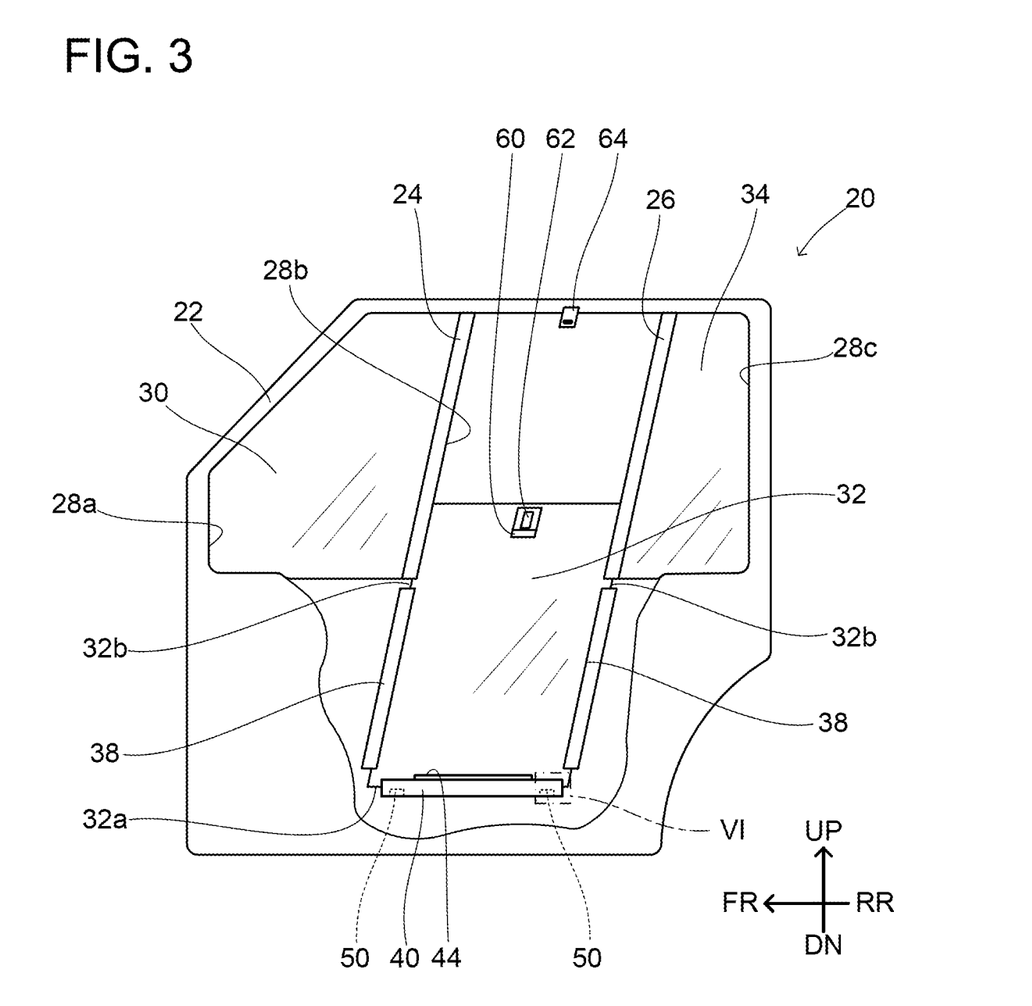
FIG. 3 shows the door 20 and its interior structure seen from within the vehicle 10 (that is, from within the cabin), where the window panel 32 is at a lower limit position.

As shown in FIGS. 2 and 3, the window panel 32 is directly manipulated by the user in the up-down direction between an upper limit position where the window panel 32 closes the window opening 28b and a lower limit position where the window panel 32 opens the window opening 28b. Side edges 32b of the window panel 32 are slidably supported by the two bars 24 and 26. Further, a pair of rails 38 that supports the side edges 32b of the window panel 32 such that the side edges 32b are slidable is also provided inside the door 20. A knob 60 configured to be gripped by the user is provided on the window panel 32. The knob 60 is attached to an inner surface of the window panel 32 and protrudes from the inner surface of the window panel 32. The user can easily manipulate the window panel 32 by using the knob 60. That is, the user can raise and lower the window panel 32 by gripping the knob 60.

The knob 60 includes a movable hook 62 configured to be manipulated by the user. The window frame 22 includes a hook receiver 64 corresponding to the hook 62. The hook receiver 64 engages with the hook 62 when the window panel 32 is at the upper limit position. The window panel 32 at the upper limit position is thereby locked such that it does not drop under its own weight. The positions of the knob 60, the hook 62, and the hook receiver 64 are not particularly limited. For example, the knob 60 and the hook 62 may be at different positions from each other. Alternatively, the hook 62 may be provided on the window frame 22 and the hook receiver 64 may be provided on the window panel 32.

As shown in FIGS. 2 and 3, a lower support 40, an anti-vibration member 44, and two stoppers 50 are provided inside the door 20. The lower support 40 is an elongated member extending in the front-rear direction and is constituted of a resin material. However, the material constituting the lower support 40 is not particularly limited. The lower support 40 includes a groove 42 extending in a longitudinal direction of the lower support 40, that is, in the front-rear direction of the vehicle 10. The groove 42 is open upward and is configured to receive a lower edge 32a of the window panel 32 when the window panel 32 is at the lower limit position. The anti-vibration member 44 is constituted of a material that is more flexible than the lower support 40 and is interposed between the groove 42 of the lower support 40 and the window panel 32. As above, the window panel 32 at the lower limit position is stably supported by the pair of rails 38 and the lower support 40.

As shown in FIGS. 4 to 7, the two stoppers 50 are located in the groove 42 of the lower support 40. The number of the stoppers 50 is not limited to two. In the vehicle 10 according to the present embodiment, the two stoppers 50 are disposed respectively on both sides of the anti-vibration member 44, although this is merely an example. The stoppers 50 are constituted of a rubber material and have suitable flexibility. The material constituting the stoppers 50 is not limited to the rubber material and may be another material that is more flexible (that is, has lower rigidity) than the window panel 32. Each of the stoppers 50 includes an abutting surface 52. The abutting surfaces 52 are located on upper surfaces of the stoppers 50 and are configured to abut the lower edge 32a of the window panel 32 when the window panel 32 is at the lower limit position. The abutting surfaces 52 are curved to protrude upward. The window panel 32 does not have a frame, and thus the abutting surfaces 52 of the stoppers 50 directly contact the lower edge 32a of the window panel 32.

As described, in the vehicle 10 according to the present embodiment, the window panel 32 configured to be manually raised and lowered is employed in the window opening 28b provided in the door 20. This window panel 32 is directly manipulated by the user in the up-down direction between the upper limit position where the window panel 32 closes the window opening 28b and the lower limit position where the window panel 32 opens the window opening 28b. When the window panel 32 is at the lower limit position, the lower edge 32a of the window panel 32 is in the groove 42 of the lower support 40 and abuts the abutting surfaces 52 of the stoppers 50. The stoppers 50 are constituted of the material that is more flexible than the window panel 32. Thus, even when the window panel 32 is manipulated with a great force or when the window panel 32 drops under its own weight, for example, damage to the window panel 32 can be avoided.

Figure 6:
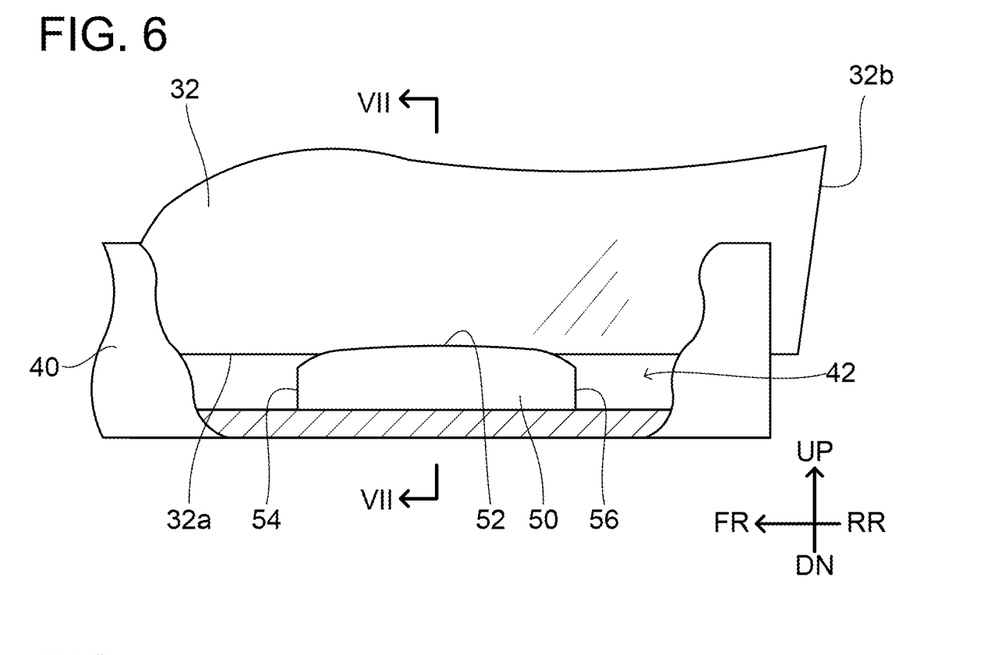
FIG. 6 is an enlarged view of a part VI in FIG. 3 and especially shows the lower support 40, the stopper 50, and the window panel 32. In order to illustrate the stopper 50, the lower support 40 is shown with a part of it removed.
Figure 7:
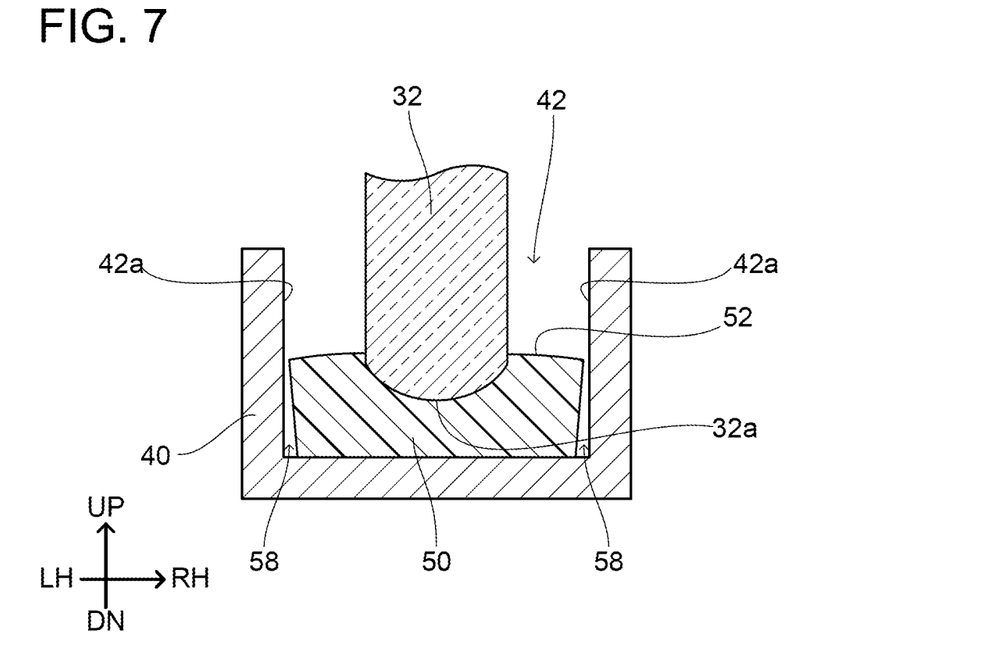
FIG. 7 is a cross-sectional view along a line VII-VII in FIG. 6 and especially shows the lower support 40, the stopper 50, and the window panel 32.

The stoppers 50 being located in the groove 42 of the lower support 40 makes the lower edge 32a of the window panel 32 less likely to detach from the stoppers 50. On the other hand, the stoppers 50 being located in the groove 42 of the lower support 40 allows a foreign matter such as a small stone to fall on the abutting surfaces 52 of the stoppers 50. However, the abutting surfaces 52 of the stoppers 50 are curved to protrude upward, and thus the foreign matter is less likely to remain thereon. Thus, it is possible to avoid the foreign matter being caught between the window panel 32 and the stoppers 50.

The shape of the abutting surfaces 52 is not particularly limited. For example, a curvature radius of the abutting surfaces 52 may be constant along the front-rear direction or may vary continuously or intermittently along the front-rear direction. Further a part of each abutting surface 52 may be a flat surface. How much the abutting surfaces 52 protrude upward, that is, a dimension H of the abutting surfaces 52 in the up-down direction (see FIG. 4) is also not particularly limited. The dimension H may be 3 mm or more or may be 5 mm or more, although these are merely examples. The specific shape of the stoppers 50 may be designed depending on the thickness and weight of the window panel 32.

Figure 4:
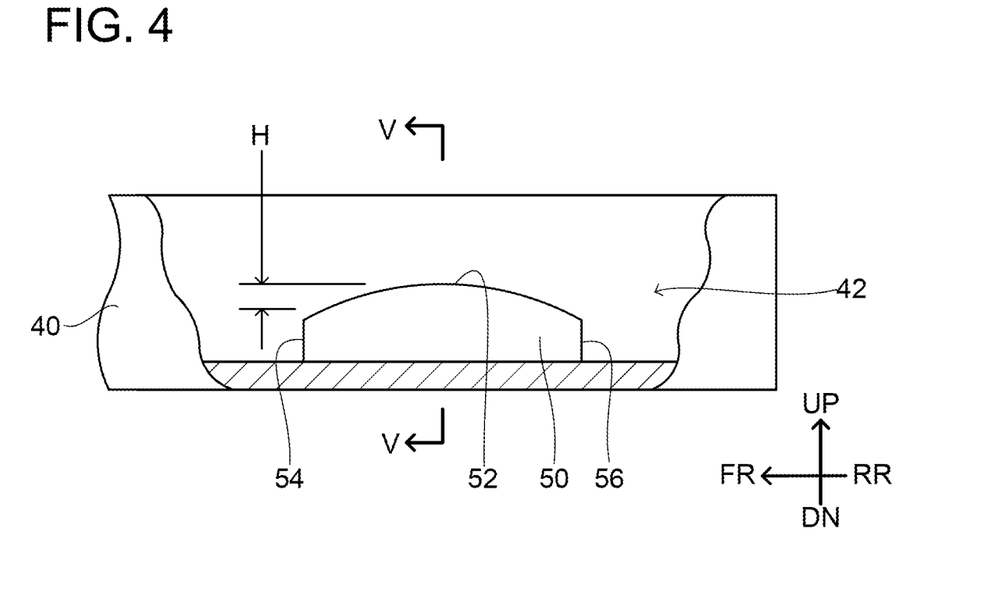
FIG. 4 is an enlarged view of a part IV in FIG. 2 and especially shows a lower support 40 and a stopper 50. In order to illustrate the stopper 50, the lower support 40 is shown with a part of it removed.
Figure 5:
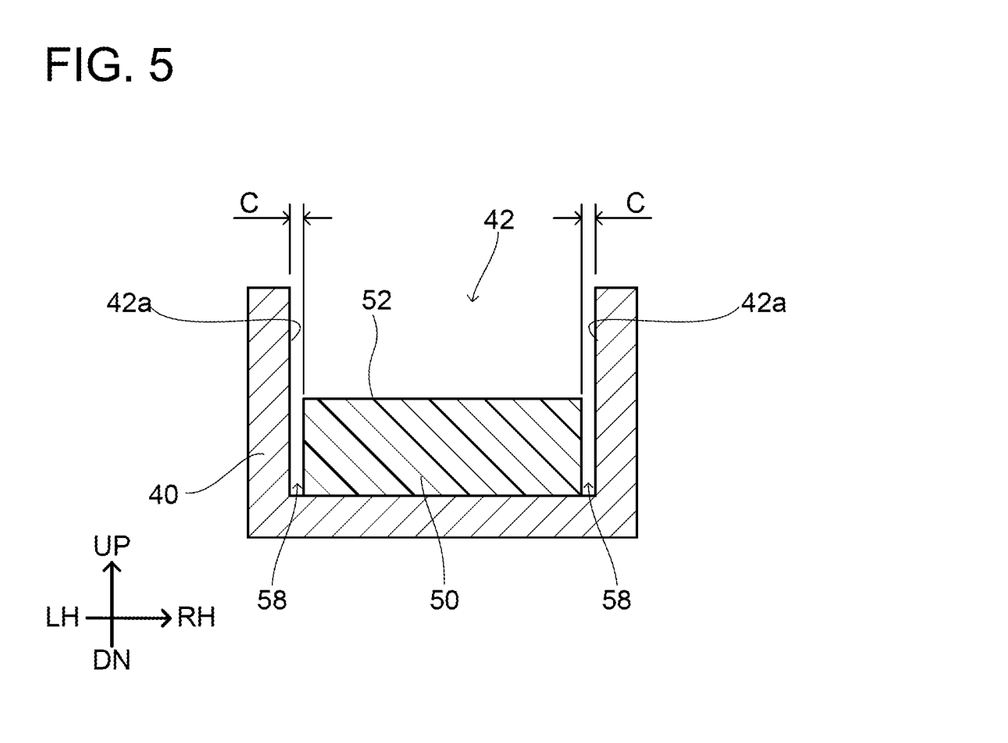
FIG. 5 is a cross-sectional view along a line V-V in FIG. 4 and especially shows the lower support 40 and the stopper 50.

In the vehicle 10 according to the present embodiment, the abutting surfaces 52 of the stoppers 50 are curved at least in the front-rear direction. That is, the abutting surfaces 52 of the stoppers 50 are each inclined along the front-rear direction. Such a configuration facilitates removal of the foreign matter from the abutting surfaces by inertia caused by acceleration or deceleration of the vehicle 10. Alternatively as another embodiment, the abutting surfaces 52 of the stoppers 50 may be curved along the left-right direction in addition to or as an alternative to the front-rear direction.

In the vehicle 10 according to the present embodiment, each of the stoppers 50 further comprises a front end surface 54 and a rear end surface 56. The front end surface 54 is positioned at a front end of the stopper 50 and forward of the abutting surface 52. The rear end surface 56 is positioned at a rear end of the stopper 50 and rearward of the abutting surface 52. Each of the front end surface 54 and the rear end surface 56 is a vertical abutting surface that is vertical to the front-rear direction. Such a configuration makes a foreign matter within the groove 42 of the lower support 40 less likely to climb onto the abutting surfaces 52. Here, being vertical to the front-rear direction is not limited to an angle formed with the front-rear direction being 90 degrees, but it means that the angle is in a range of 90 degrees±15 degrees.

In the vehicle 10 according to the present embodiment, the groove 42 of the lower support 40 comprises a pair of side surfaces 42a opposed each other with the stoppers 50 interposed therebetween. Gaps 58 may be provided between the side surfaces 42a and the stoppers 50. According to such a configuration, when the lower edge 32a of the window panel 32 abuts the stoppers 50, deformation of the stoppers 50 is not restricted by the side surfaces 42a of the groove 42. Alternatively, it may be designed such that the deformed stoppers 50 abut the side surfaces 42a of the groove 42. By intentionally bringing the deformed stoppers 50 to abut the side surfaces 42a of the groove 42, excessive deformation of the stoppers 50 can be curtailed. In view of the above, a dimension C of each gap 58 may suitably be designed.

In the vehicle 10 according to the present embodiment, the lower edge 32a of the window panel 32 is curved such that it protrudes downward in a thickness direction of the window panel 32 (see FIG. 7). Thus, even when a foreign matter is caught between the window panel 32 and at least one of the stoppers 50, the foreign matter is likely to be removed by the inclination of the lower edge 32a of the window panel 32. Therefore, damage to the window panel 32 can effectively be mitigated.

What is claimed is:

1. A vehicle, comprising:
   a vehicle body;
   a door provided on the vehicle body and configured to be opened and closed with respect to the vehicle body;
   a window frame provided in the vehicle body or the door;
   a window panel provided in the window frame, configured to be manually raised and lowered, and supported to be movable between an upper limit position where the window panel closes an opening of the window frame and a lower limit position where the window panel opens the opening of the window frame;
   a lower support comprising a groove, the groove being configured to receive a lower edge of the window panel when the window panel is located at the lower limit position; and
   a stopper disposed in the groove of the lower support and comprising an abutting surface configured to abut the lower edge of the window panel, wherein the abutting surface is curved to protrude upward.

2. The vehicle according to claim 1, wherein the abutting surface of the stopper is curved at least in a front-rear direction.

3. The vehicle according to claim 2, wherein
   the stopper further comprises a vertical abutting surface at at least one end of the abutting surface in the front-rear direction, and
   the vertical abutting surface is vertical to the front-rear direction.

4. The vehicle according to claim 1, wherein
   the groove of the lower support comprises a pair of side surfaces opposed each other with the stopper interposed therebetween, and
   a gap is provided between at least one of the pair of side surfaces and the stopper.

5. The vehicle according to claim 1, wherein at least a part of the stopper is constituted of a material that is more flexible than the window panel.

6. The vehicle according to claim 5, wherein the at least a part of the stopper is constituted of a rubber material.

7. The vehicle according to claim 1, wherein the window frame is provided in the door.

8. The vehicle according to claim 1, wherein a knob configured to be gripped by a user is provided on the window panel.

9. The vehicle according to claim 8, wherein
   the knob is provided with a movable hook configured to be manipulated by the user; and
   the window frame is provided with a hook receiver configured to engage with the hook to lock the window panel when the window panel is located at the upper limit position.

* * * * *